May 14, 1957 — L. H. MORIN — 2,791,807
METHOD OF PRODUCING SEPARABLE FASTENER STRINGERS WITH EXTRUDED
PLASTIC FASTENER ON ONE EDGE PORTION OF THE TAPE THEREOF
Filed Nov. 28, 1952
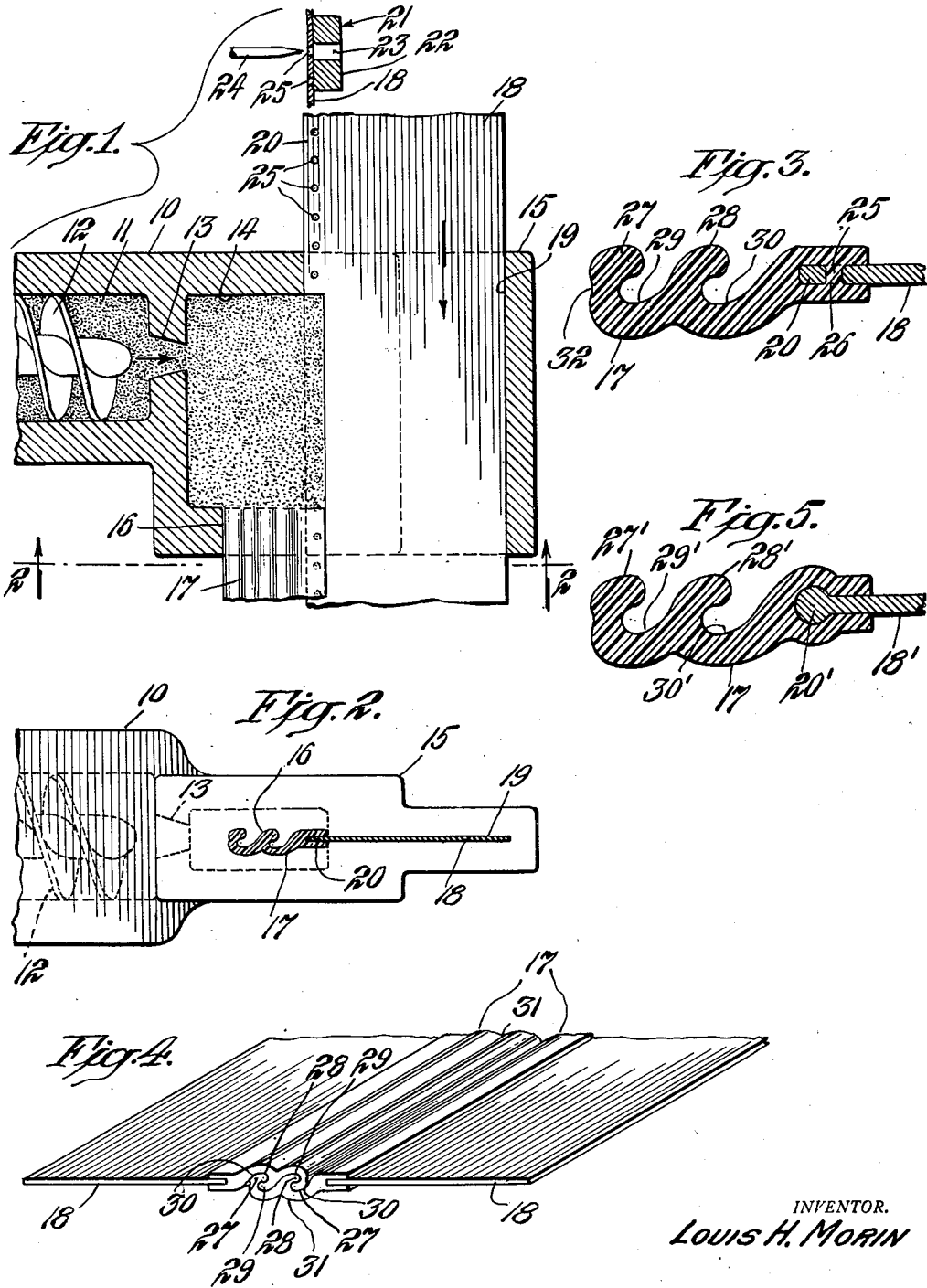
INVENTOR.
LOUIS H. MORIN
BY
ATTORNEY United States Patent Office 2,791,807
Patented May 14, 1957

2,791,807

METHOD OF PRODUCING SEPARABLE FASTENER STRINGERS WITH EXTRUDED PLASTIC FASTENER ON ONE EDGE PORTION OF THE TAPE THEREOF

Louis H. Morin, Bronx, N. Y.

Application November 28, 1952, Serial No. 322,968

3 Claims. (Cl. 18—59)

The invention relates to the extrusion of separable fasteners of plastic or like material in the form of continuous strips and in particular to a method of extruding and simultaneously embedding in and interlocking with such strips the edge portion of a tape of a fabric or the like by which the plastic strips may be attached, by sewing, to the articles to which the respective fastener strips are desired to be secured.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view illustrating the head end portion of an extrusion cylinder and showing the method of applying an extruded fastener directly to a tape edge and also indicating a tape piercing station for piercing the tape edge prior to attachment of the extruded fastener thereto.

Fig. 2 is a section on the line 2—2 of Fig. 1.

Fig. 3 is an enlarged sectional detail view of the fastener edge portion of the stringer made according to the method disclosed in Figs. 1 and 2.

Fig. 4 is a perspective view diagrammatically illustrating a small section of a pair of coupled stringers of the type shown in Figs. 1 to 3, inclusive; and Fig. 5 is a view similar to Fig. 3 showing an extruded fastener attached to a modified form of tape.

In Figs. 1 and 2 of the drawing, I have diagrammatically shown at 10 the discharge end portion of a heated extrusion cylinder, in which heated plastic material 11 is fed by a screw 12 through a discharge opening 13 into a chamber 14 of the head 15. The head is enlarged with respect to the cylinder 10 and the chamber 14 has a cavity discharge 16 which might be termed a contoured orifice which governs the cross-sectional contour of the major part of the resulting extruded fastener 17 to be formed.

Alongside the chamber 14 is a tape guide passage which is bounded along its outer side by the wall 19 (Fig. 1). At 21 I have shown a tape piercing station which may be positioned reasonably close to the cylinder 10, the station being shown diagrammatically in a position at right angles to the showing of the cylinder 10 and tape 18, as will be apparent.

The station 21 comprises a backing plate 22 having an aperture 23 therein. In alinement with the aperture 23 is a movable piercing rod or needle 24 to form, at predetermined spaced intervals on the edge portion 20 of the tape 18, apertures 25.

The tape is arranged with its perforated edge portion only disposed transversely of the head chamber and extending out through the discharge passage, the remainder of the tape being disposed outside of the chamber in the guide passage.

It will thus be seen that, as the extruded fastener 17 is formed on the perforated or apertured edge portion of the tape 20 and issues from the aperture 16, it will draw the tape along with it and thus automatically effect a continuous feeding and guiding of the tape into and through the head 15. In this operation, it will be apparent that the plastic material extends through the apertures, as seen at 26 in Fig. 3 of the drawing. In the construction shown, the fastener 17 is of the cross-sectional contour shown clearly in Fig. 3 of the drawing and comprises two transversely spaced outer and inner coupling flanges 27 and 28 of more or less hook-shaped cross-sectional contour.

Inwardly of the flanges 27 and 28 are correspondingly formed grooves or recesses 29 and 30. The hook-shaped flanges 27 and 28 may be regarded as the male coupling portion of the fastener; whereas, the recesses 29 and 30 may be regarded as the female coupling portions.

Considering Fig. 4 of the drawing, it will be apparent that the flanges 27 of the extruded fastener of one stringer enters the recess 30 of the opposed fastener; whereas, the flange 28 enters the recess 29 of the said opposed stringer in coupling the fasteners of the two stringers together. To give flexibility to the fasteners 27, the outer surfaces of the fasteners are grooved, as seen at 31, between the recesses 29 and 30. It will also be apparent that a slight groove or indenture 32 is formed at the outer edge of the fastener so as to give flexibility to the flange 27.

A suitable coupling medium, such as a slider, can be utilized to operate along the fastener portions of the stringers in coupling and uncoupling the same, but this slider is not shown, as it forms no direct part of the present invention.

In Fig. 5 of the drawing, I have shown another way of shaping or preforming the edge portion of the tape to adapt it for interlocking with the extrusion material. It will be seen that the tape 18', instead of having a pierced or apertured edge portion as above described, is provided with a beaded edge 20'. The structure of Fig. 5 is otherwise the same as that shown in Figs. 1 to 3 and produced in the same manner. For general identification and reference, the flanges are indicated at 27', 28' and the grooves at 29' and 30'.

It will be understood that, as is common in extrusion processes, the head 15, in the vicinity of the aperture 16, can be and preferably is cooled in any suitable manner so as to accelerate the setting of the extruded material as it is discharged from the orifice 16 and moved along with the tape. Additional cooling may be had by passing the product through cooling stations, particularly if it is desirable to fix the extruded product promptly for handling purposes.

As with the other extrusion machines of the kind under consideration, it is understood that the raw material is fed into a delivery end of the cylinder 10 through a hopper and the material is gradually heated so that, at the discharge 13, it will be in a sufficiently heated condition to render the same mouldable to producing fasteners, such as the fastener 17. Constant pressure is applied to the material so as to insure complete filling of the mould or contour orifice 16. A method of this type and kind will facilitate the reasonably fast production of finished separable fastener stringers in long workpiece lengths which can be later cut to desirable fastener lengths in producing fasteners for any desired use.

The interengagement of the male and female coupling portions 27, 28, 29 and 30 will retain the stringers against pull apart and lateral displacement one with respect to the other and, at the same time, produces a substantially sealed closure between the two stringers, thus adapting the fastener to uses where a substantially complete closure is desirable. It will be apparent that the illustration in the accompanying drawing shows one adaptation of the fastener as applied to stringer tape, but the shape and form of the extruded fastener can be modified to suit different uses. In the accompanying drawing, a double engagement is provided by use of the two flanges or male couplings 27 and 28 and the two recesses or grooves 29 and 30. In some instances, a single flange and a single groove will suffice.

Having fully described my invention, what I claim as new and desire to secure by Letters Patent is:

1. The method of producing separable fastener stringers having extruded fasteners fixed to and extending continuously along one edge portion of a tape, which consists in arranging an elongated tape in an extrusion head at one end of an extrusion cylinder, said head being elongated longitudinally of the tape arranged therein, said head having a chamber extending longitudinally thereof with a contour discharge passage at one end of said chamber, arranging one edge portion only of the tape in said chamber and part of said contour discharge passage, said passage controlling the shape of the extruded fastener to be formed on said edge of the tape, the tape disposed in said passage having means for anchorage of the extruded fastener on said edge, forming the extruded fastener on said edge portion by pressure feeding of heated plastic material into said chamber and passage, and feeding the tape through the head and said passage by the action of the extruded material.

2. The method of producing separable fastener stringers having extruded fasteners fixed to and extending continuously along one edge portion of a tape, which consists in arranging an elongated tape in an extrusion head at one end of an extrusion cylinder, said head being elongated longitudinally of the tape arranged therein; said head having a chamber extending longitudinally thereof with a contour discharge passage at one end of said chamber, arranging one edge portion only of the tape in said chamber and part of said contour discharge passage, said passage controlling the shape of the extruded fastener to be formed on said edge of the tape, the tape disposed in said passage having means for anchorage of the extruded fastener on said edge, forming the extruded fastener on said edge portion by pressure feeding of heated plastic material into said chamber and passage, feeding the tape through the head and said passage by the action of the extruded material, and shaping said contour passage to form, on the resulting extruded plastic fastener outwardly of the edge portion of the tape, a longitudinal male coupling of hook-shaped cross-sectional form, and a corresponding formed longitudinally extending recess forming the female coupling portion and arranged inwardly of said male coupling portion.

3. The herein described method of forming an elongated extruded plastic edging of predetermined cross-sectional contour continuously along and outwardly of one edge portion only of a fabric material with said edge portion fashioned for anchorage of the plastic edging thereon, which consists in arranging the anchorage edge portion of a fabric material longitudinally along an elongated chamber of an extrusion head disposed at one end of an extrusion cylinder and partially in a contour discharge passage disposed at and communicating with one end of said chamber, pressure injecting heated plastic material from said cylinder into the chamber of said head and contour discharge passage, feeding the fabric material through the head and said passage by the action of the extruded material, and guiding the fabric material beyond the head in the movement of said material through the head.

References Cited in the file of this patent

UNITED STATES PATENTS

| | | |
|---|---|---|
| 815,571 | Williams | Mar. 20, 1906 |
| 1,891,989 | Johnson | Dec. 27, 1932 |
| 1,965,844 | Loomis | July 10, 1934 |
| 2,056,856 | Hora | Oct. 6, 1936 |
| 2,102,328 | Morin | Dec. 14, 1937 |
| 2,175,198 | Klein | Oct. 10, 1939 |